United States Patent [19]
Sand

[11] Patent Number: 5,779,793
[45] Date of Patent: Jul. 14, 1998

[54] DEVICE FOR FEEDING OUT FIBRES AT PRODUCTION OF THERMOSETTABLE FIBRE REINFORCED PRODUCTS

[75] Inventor: Kjell Sand, Västra Frölunda, Sweden

[73] Assignee: Aplicator System AB, Sweden

[21] Appl. No.: 571,874

[22] PCT Filed: Jul. 6, 1993

[86] PCT No.: PCT/SE93/00616
§ 371 Date: Jan. 4, 1996
§ 102(e) Date: Jan. 4, 1996

[87] PCT Pub. No.: WO95/01939
PCT Pub. Date: Jan. 19, 1995

[51] Int. Cl.[6] .................. B05C 11/00; D02G 3/00
[52] U.S. Cl. ................ 118/36; 428/378; 118/307
[58] Field of Search .................. 118/307, 300, 118/323, 35, 36; 425/294, 510, 515, 102, 90, 94; 83/439, 443, 663, 907, 922, 949; 264/138, 145, 146, 147, 160; 428/378

[56] References Cited

U.S. PATENT DOCUMENTS 4,806,298  2/1989  Wilkinson et al. .......... 118/36
4,869,863  9/1989  Iwai et al. .................. 425/294

FOREIGN PATENT DOCUMENTS 1257352  2/1961  France .
407536   4/1979  Sweden .

*Primary Examiner*—Donald E. Czaja
*Assistant Examiner*—Calvin Padgett
*Attorney, Agent, or Firm*—Ostrolenk, Faber, Gerb & Soffen, LLP

[57] ABSTRACT

A device for feeding out reinforcement fibres at production of thermosetting plastic products, which device includes at least one magazine spool for a fibre thread (15), and guiding means (17, 18, 19) for guiding the fibre thread to a fibre feedout head (13). The feedout head is provided with feed means (21, 22, 31, 32) for feeding the fibre thread from the magazine spool coil via the guiding means, and cutting means (26, 26a, 27), which enables cutting off the fibre thread. The feed means of the feedout head (13) means includes on one hand driven feed rollers (21, 22), which form at least one nip for the fibre thread (15) and on the other hand fibre ejecting means (31, 32). The cutting means (26, 26a, 27) are individually driven and placed between the feed rollers (21, 22) and the fibre ejecting means (31, 32).

25 Claims, 2 Drawing Sheets

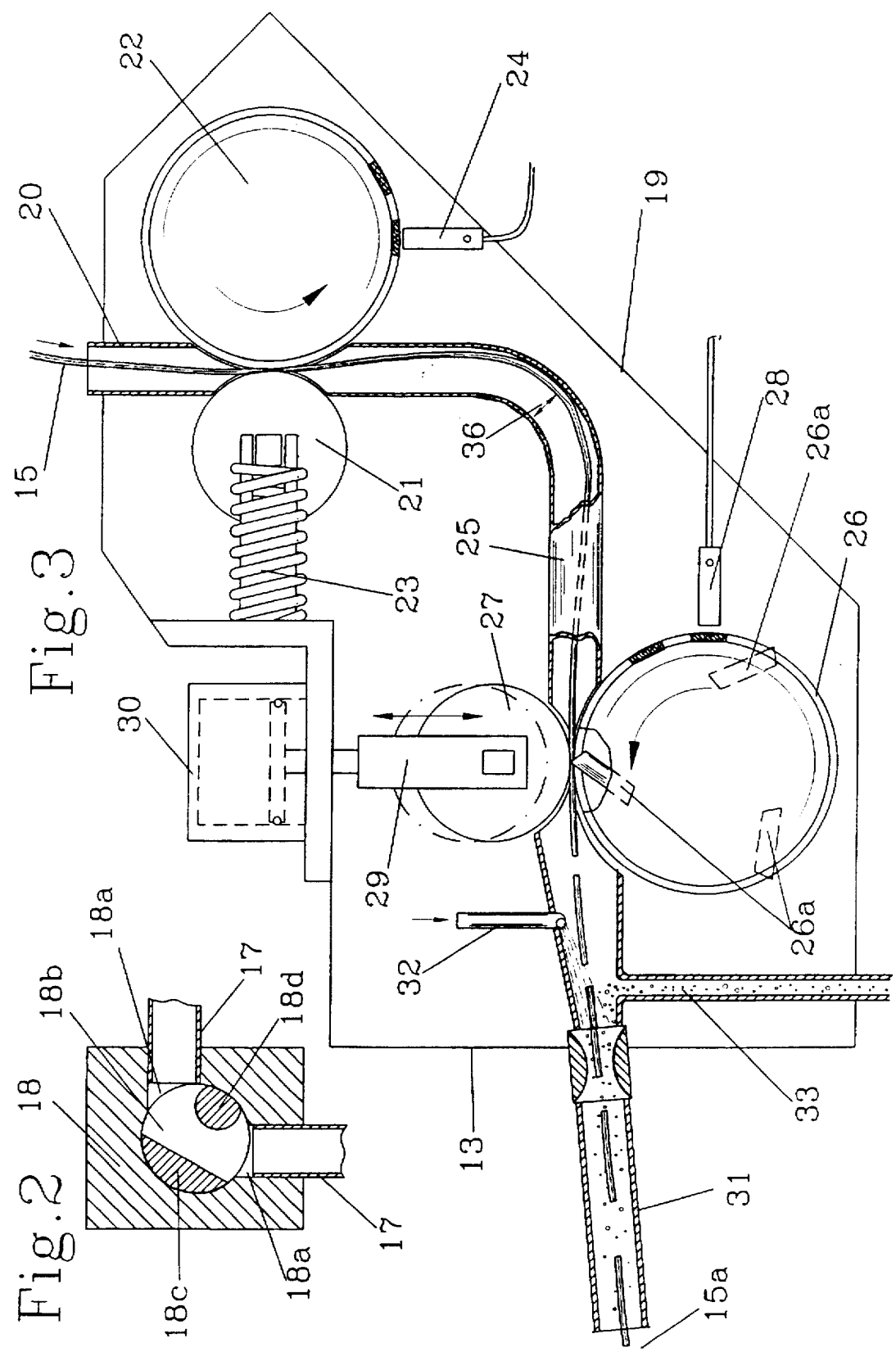

DEVICE FOR FEEDING OUT FIBRES AT PRODUCTION OF THERMOSETTABLE FIBRE REINFORCED PRODUCTS

TECHNICAL FIELD

The present invention refers to a device for feeding out reinforcement fibres at production of thermosetting plastic products, which device includes at least one magazine spool for a fibre thread, and guiding means for guiding the fibre thread out to a fibre feedout head, which feedout head is provided with feeding means for feeding the fibre thread from the magazine spool via the guiding means, and cutting means, which enables cutting of the fibre thread, wherein the feeding means of the feedout head includes on one hand driven feed rollers, which form at least one nip for the fibre thread and on the other hand fibre ejecting means.

BACKGROUND OF THE INVENTION

The production of fibre reinforced thermosetting plastic products is difficult to automate, since the quality of the product is highly dependent on the orientation of the fibres, with regard to how the product will be subjected to load. Modern quality conditions usually implies that a product should have an exact amount of fibres, which are oriented for maximum strength, without the fibres projecting out through the outer plastic layer of the product.

One manufacturing method implies that fibre carpets are preformed to desired shape and exerts the preform to heat treatment for activation of a bonding agent keeping the fibres together. The edge of the preform, produced in this manner is usually cut manually, so that excess fibres are removed at the edges before the final casting of thermosetting plastic takes place. The application of fibre carpets and the need of manual removal of excess fibres means that this manufacturing method is expensive. Furthermore, the strength of the fibres is utilized only to a small degree.

Consequently, there are possibilities for improvements in this field, which improvements by automation of the manufacturing process provides better use of the material, so that structures repeatedly can be made lighter, material acquisitive and technically more advanced. Thereby, even possibilities of reducing the problems of poor working environment and wear of manpower are obtained.

THE TECHNICAL PROBLEM

The object of the present invention is to provide a device for feeding out reinforcement fibres at production of thermosettable products, which makes it possible to automate the supply of reinforcement fibres to a product, e.g. by use of an industrial robot, thus that preforms may be produced repeatedly from fibre thread with the fibres arranged in endless coils, cut fibres with regular orientation and cut fibres with irregular orientation.

THE SOLUTION

For this purpose the invention is characterized in that the cutting means are driven individually from the feed rollers and located between said rollers and the fibre ejecting means, and that the cutting means includes a driven knife roller with outwardly projecting knife blades and a backing roller, which is operable to positions in engagement with or non-engagement with the knife roller.

DESCRIPTION OF THE DRAWINGS

Hereinafter the invention will be described with reference to embodiments shown in the accompanying drawings, on which

FIG. 2 shows in bigger scale an angled section forming part of the feeding out device.

FIG. 3 shows in a scale corresponding to FIG. 2, as seen from the side, a feedout head forming part of the feeding out device.

DESCRIPTION OF EMBODIMENTS

Figure 1:
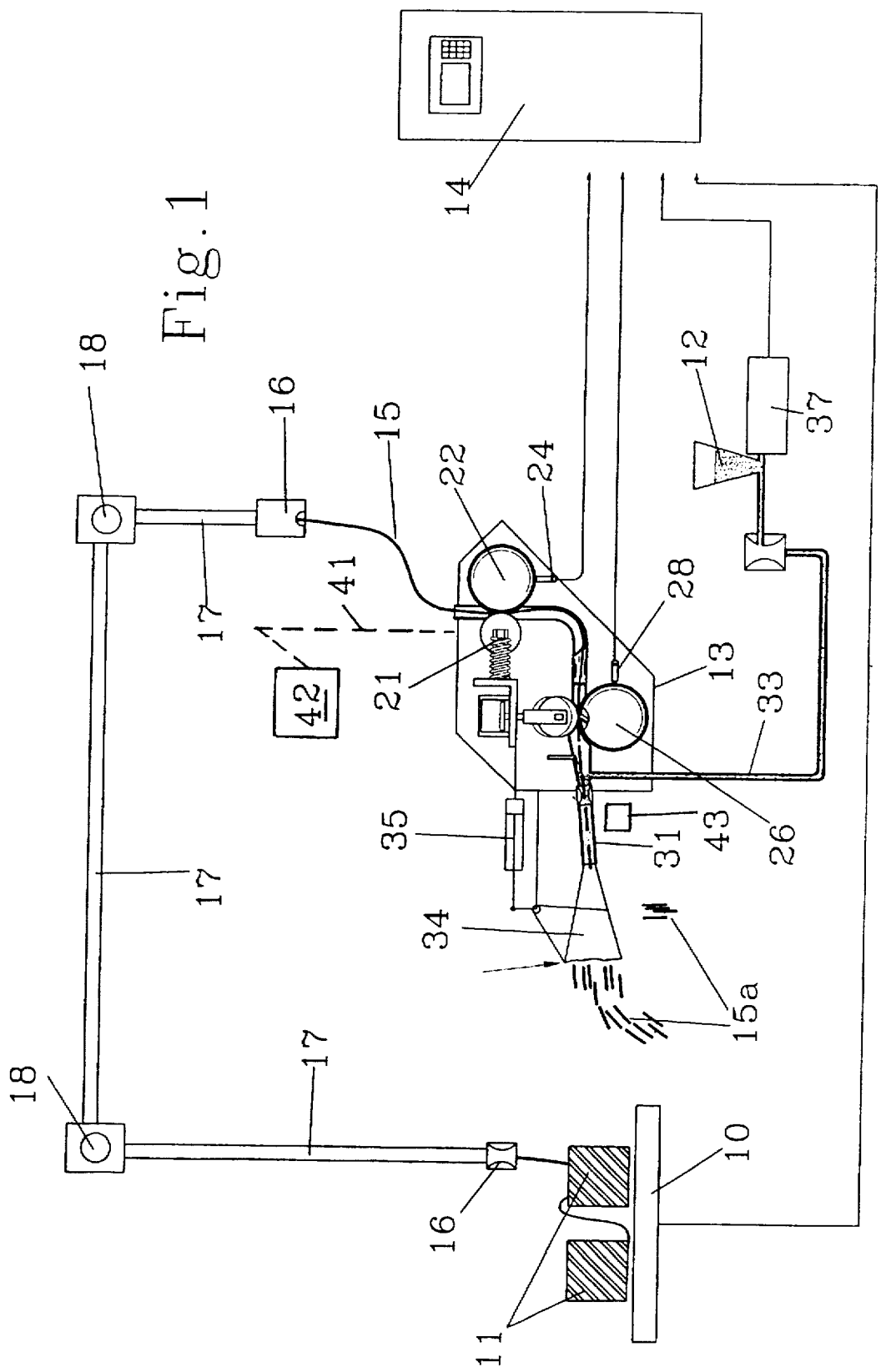
FIG. 1 shows schematically a feeding out device according to the invention as seen from the side.

The device schematically shown in FIG. 1 includes a magazine 10 for fibre thread spools 11, a magazine 12 for pulverulent bonding agent, a feedout head 13 for fibre thread and bonding agent, and a control center 14.

The feedout head 13 is preferably mounted on a robot arm 41, which is freely movable in the room and is governed by a micro processor 42, which can be programmed.

The fibre thread 15 runs via a feeding device up to the feedout head 13. The feeding device includes end pieces 16, straight tubular pieces 17 and angled pieces 18. The end piece 16 situated closest to the thread spool 11 is provided with connection for compressed air, which pressure medium is used to advance the end on the fibre thread through the feeding device to the feedout head 13, which during this time is situated in a docking position adjacent the feedout end piece 16 of the feeding device. When the end of the thread has reached the feedout head 13, the fibre thread will be pulled through the feeding device by means of feed rollers. The feedout head 13 thereupon can move from its docking position.

One of the angled sections 18 is shown more in detail in FIG. 2 and it includes a rectangular block 18 with holes 18a located at right angle against each other and intended for the tubes 17 leading in to a central chamber 18b. The chamber 18b on one hand is equipped with a deflection wall 18c, which is adapted to deflect the fibre end fed by compressed air, from one tube to the other, and on the other hand an angled needle 18d, which forms a contact surface for the thread, when this is pulled through the feeding device. The angled needle 18d is positioned thus in relation to the tubes 17, that the thread will not engage the inner side of the tubes in the area of the angled pieces 18.

The feedout head 13 is shown more in detail in FIG. 3 and it is accommodated in a housing 19. A guide tube 20 for the fibre thread 11 is provided in the housing 19. The guide tube 20 extends in to the nip between two rollers 21, 22, roller 21 of which is displaceable supported and urged in a direction towards the other roller 22 by means of a pressure spring 23. The roller 22 is driven in a speed adjustable manner at a speed $V_1$ by means of a non shown driving motor. The speed adjustment is achieved by means of pulse counting means 24, which are connected to the control center 14.

The rollers 21, 22 advance the fibre thread 15 through a tube 25, angled at about 90°, which opens in the nip between a knife roller 26 and a backing roller 27. The knife roller 26 is equipped with three knife blades 26a, evenly spaced apart along the periphery of the roller. The roller 26 can be driven in a speed-adjustable manner at a speed $V_2$ by means of a non shown driving motor. The speed adjustment is achieved by means of pulse counting means 28, which are connected to the control center 14. The backing roller 27 is displaceable mounted in a vertical guide 29 and operable by means of a pneumatic piston cylinder 30.

The feedout head 13 is provided with a feeding out tube 31, which is equipped with a connection 32 for compressed air, which pressure medium is used for feeding out cut thread pieces 15a. Furthermore the feedout tube 31 is provided with a connection 33 (see FIG. 1) to a control unit for supply of pulverulent bonding agent from the magazine 12. The tube 31 is electrically insulated from the other part of the feedout head 13. By suitable choice of material the fibre thread can be statically charged electrically at its passage through the tube by electrical charge supply means 43 at the tube 31. This arrangement implies, that the pulverulent bonding agent will adhere to the fibre fed out.

A deflection plate 34 (see FIG. 1), which is pivotable from one operating position to another, is operable by means of a pneumatic piston cylinder 35. When the deflection plate 34 is in inactive position, the cut fibres 15a will be fed out on a surface oriented irregularly in the longitudinal direction. When the deflection plate 34 is in operative position, the cut fibres 15a will be fed out on a surface oriented in a regular longitudinal direction.

With the device described above the fibre thread can be fed out as a continuous fibre coated with bonding agent. The robot arm thereby can control the feedout head 13 in such a manner, that the endless fibre is oriented in an advantageous manner, e.g. in coils around a hole that shall receive a bolt. Alternatively the fibres may be cut in exactly desired lengths, by starting the knife roller 26 and rotating it in contact with the backing roller 27 at a speed which gives an appropriate knife frequency in proportion to the speed of the fibre, which is controlled by the speed of the driving roller 22.

At each instant of cutting, the fibre thread 15 is pulled forward intermittently a short distance at a speed higher than the normal advance speed of the thread. For ascertaining that there are no jerks in the thread, which can cause thread ruptures or increased wear on the driving rollers 21, 22, the tube 25 bent to arc-form serves as a jerk equalizer. Normally the driving rollers 21, 22 press the thread 15 through the tube 25, thus that the thread follows the outer radius of the tube interior. When a knife blade then grips the thread to cut it off against the backing roller 27, there is a certain play for the fibre thread in the advance area between the feeding rollers 21, 22 and the fibre ejecting means, which play is illustrated in FIG. 2 by the double arrow 36, which shows the play between the fibre thread 15 and inner radius of the interior of tube 25.

The magazine 12 is provided with feeding means 37 for exact dosage of the bonding agent powder. These means 37 are connected to the control center 14. The magazine 10 for fibre thread 15 is furthermore designed as an electronic scale, which also is connected to the control center 14. This means that the fibre and powder supply can be exactly controlled, thus that a preform for casting a thermosettable plastic product can be built up with a correct amount of fibres and bonding agent.

The invention furthermore can be utilized for production of glass fibre reinforced thermoplastic materials in one single step without pre-forming.

The above described device can be doubled within the same cover 19 for feeding out two fibre threads. At the same time it is easy to equip the robot arm with two such feedout heads, whereby the robot can handle four threads in parallel.

The invention is not limited to the embodiments described here above, but several variants are conceivable within the scope of the following claims. The feedout head 13, for instance, may be connected to conduits for feeding out liquid bonding agents, or some type of plastic, e.g. polyurethane. The feedout tube 31 can be replaced by a sliding plate, channel or a gutter.

I claim:

1. A device for feeding reinforcement fibres for production of thermosettable plastic products, said device comprising:

at least one magazine for containing a fibre thread; and a fibre feedout head, guiding means for guiding the fibre thread from the magazine to the fibre feedout head, the feedout head being provided with feeding means for feeding the fibre thread from the magazine through the guiding means, and cutting means positioned and arranged after the feeding means in the path of the fibre thread and adapted to cut the fibre thread, wherein the feeding means of the feedout head includes driven feed rollers which form at least one nip for the fibre thread, and fibre ejecting means, wherein the cutting means are driven from the feed rollers and are located between the feed rollers and the fibre ejecting means, the cutting means including a driven knife roller with outwardly projecting knife blades and a backing roller which is opposite the knife roller and is operable to either a position of engagement with the knife roller to permit cut fibres to be ejected from the fibre ejecting means or to a position of non-engagement with the knife roller to permit continuous fibres to be ejected from the fibre ejecting means.

2. A device according to claim 1, wherein the fibre thread runs in an arcuate path between the feed rollers and the fibre ejecting means.

3. A device according to claim 2, further comprising: a tube preceding the feed rollers in the path of the fiber thread, wherein the fibre thread travels through the tube, at least a portion of the tube is bent in an arcuate shape, the tube having a diameter which allows a predetermined amount of play for the fibre thread in an advance area between the feed rollers and the fibre ejecting means, the play enabling the end of the fibre thread to be moved forward intermittently a short distance at a speed higher than a speed of the fibre thread through the feed rollers.

4. A device according to claim 1, wherein the guiding means for guiding the fibre thread from the magazine to the feedout head includes a plurality of straight tubes and angled sections interconnecting the tubes, the angled sections having an inner side having supporting means for the fibre thread providing a small contact surface for the thread.

5. A device according to claim 1, wherein the fibre ejecting means are driven pneumatically and include means for giving the fibre thread a charge of static electricity.

6. A device according to claim 5, wherein the fibre ejecting means are provided with a connection for a controlled supply of pulverulent bonding agent.

7. A device according to claim 6, further comprising a control means including means for adjustment of the supply of pulverulent bonding agent.

8. A device according to claim 1, wherein the feedout head is moveable to selectively orient fibres ejected from the fibre ejecting means.

9. A device according to claim 8, wherein the feedout head is mounted on a robot arm, the robot arm being adapted to effect the movement of the feedout head.

10. A device for feeding reinforcement fibres for production of thermosettable plastic products, said device comprising:

at least one magazine for containing a fibre thread;

fibre feedout head, guiding means for guiding the fibre thread from a magazine to the fibre feedout head, the feedout head being provided with feeding means for feeding the fibre thread from the magazine through the guiding means, and cutting means positioned and arranged after the feeding means in the path of the fibre thread and adapted to cut the fibre thread, wherein the feeding means of the feedout head includes driven feed rollers which form at least one nip for the fibre thread, and fibre ejecting means, wherein the cutting means are driven individually from the feed rollers and are located between the feed rollers and the fibre ejecting means, the cutting means including a driven knife roller with outwardly projecting knife blades and a backing roller which is operable either to a position of engagement with or to a position of non-engagement with the knife roller;

measuring means for continuous weighing of an amount of fibre thread fed from the magazine; and control means associated with the measuring means for controlling the feed rollers to feed a selected amount of fibre thread from the magazine.

11. A device according to claim 10, wherein the control means includes means for control of the backing roller and for adjustment of the driving of the knife roller.

12. A device according to claim 10, further comprising a fibre deflection plate pivotally mounted downstream of the fibre ejecting means such that the fibre deflection plate is pivotable between an operative and an inactive position.

13. A device for feeding out reinforcement fibres for production of thermosettable plastic products, said device comprising:

a magazine for containing a fibre thread;

a feeder for feeding the fibre thread from the magazine, the feeder including a plurality of driven feed rollers which form a nip for the fibre thread;

a guide for guiding the fibre thread from the magazine to the feeder;

a cutter adapted to cut the fibre thread, the cutter including a driven knife roller with outwardly projecting knife blades and a backing roller which is opposite the knife roller; and a fibre ejector, the cutter being located between the feeder and the fibre ejector, the backing roller being operable either to a position of engagement with the knife roller to permit cut fibres to be ejected from the fibre ejector or to a position of non-engagement with the knife roller to permit continuous fibres to be ejected from the fibre ejector.

14. A device according to claim 13, further comprising a scale continuously weighing an amount of fibre thread fed from the magazine, and a controller associated with the scale and controlling the feeder to feed a selected amount of fibre thread from the magazine.

15. A device according to claim 14, wherein the controller further controls the backing roller and adjusts the driving of the knife roller.

16. A device according to claim 14, further comprising a fibre deflection plate pivotally mounted downstream of the fibre ejector such that the fibre deflection plate is pivotable between an operative and an inactive position.

17. A device according to claim 13, wherein the fibre thread runs in an arcuate path between the feed rollers and the fibre ejector.

18. A device according to claim 17, further comprising: a tube preceding the feed rollers in the path of the fiber thread, wherein the fibre thread travels through a tube, at least a portion of the tube is bent in an arcuate shape, the tube having a diameter which allows a predetermined amount of play for the fibre thread in an advance area between the feed rollers and the fibre ejector, the play enabling the end of the fibre thread to be moved forward intermittently a short distance at a speed higher than a speed of the fibre thread through the feed rollers.

19. A device according to claim 13, wherein the guide includes a plurality of straight tubes and angled sections interconnecting the tubes, the angled sections having an inner side having a support for the fibre thread providing a small contact surface for the thread.

20. A device according to claim 13, wherein the fibre ejector is driven pneumatically and is adapted to give the fibre thread a charge of static electricity.

21. A device according to claim 20, wherein the fibre ejector is provided with a connection for a controlled supply of pulverulent bonding agent.

22. A device according to claim 21, further comprising a controller controlling the supply of pulverulent bonding agent.

23. A device according to claim 13, further comprising a fibre feedout head, wherein the feeder, the cutter and the fibre ejector are provided in the fibre feedout head.

24. A device according to claim 23, wherein the fibre feedout head is moveable to selectively orient fibres ejected from the fibre ejector.

25. A device according to claim 24, wherein the feedout head is mounted on a robot arm, the robot arm being adapted to effect the movement of the fibre feedout head.

* * * * *